(12) United States Patent
Patel et al.

(10) Patent No.: US 9,477,675 B1
(45) Date of Patent: Oct. 25, 2016

(54) MANAGING FILE SYSTEM CHECKING IN FILE SYSTEMS

(71) Applicant: EMC Corporation, Hopkinton, MA (US)

(72) Inventors: DixitKumar Vishnubhai Patel, Monroe, NJ (US); Srinivasa Rao Vempati, Upton, MA (US); Jean-Pierre Bono, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 293 days.

(21) Appl. No.: 14/041,567

(22) Filed: Sep. 30, 2013

(51) Int. Cl.
*G06F 7/00* (2006.01)
*G06F 17/00* (2006.01)
*G06F 17/30* (2006.01)

(52) U.S. Cl.
CPC ................... *G06F 17/30144* (2013.01)

(58) Field of Classification Search
CPC ........... G06F 11/1451; G06F 11/1464; G06F 17/30; G06F 17/30067; G06F 17/30091
USPC ......................................................... 707/639
See application file for complete search history.

(56) References Cited

U.S. PATENT DOCUMENTS

| | | | |
|---|---|---|---|
| 2004/0220979 A1* | 11/2004 | Young | G06F 17/30067 |
| 2007/0294274 A1* | 12/2007 | Kano | G06F 17/30067 |
| 2009/0287902 A1* | 11/2009 | Fullerton | G06F 12/1081 711/206 |
| 2012/0066181 A1* | 3/2012 | Adkins | G06F 17/30138 707/639 |
| 2012/0204060 A1* | 8/2012 | Swift | G06F 11/1435 714/15 |
| 2013/0325817 A1* | 12/2013 | Whitehouse | G06F 17/3007 707/690 |

* cited by examiner

*Primary Examiner* — Hosain Alam
*Assistant Examiner* — Nicholas Allen
(74) *Attorney, Agent, or Firm* — Krishnendu Gupta; Jason A. Reyes; Deepika Bhayana

(57) ABSTRACT

A method is used in managing file system checking in file systems. Metadata of a file system is evaluated upon receiving a request to perform file system checking on the file system. Based on the evaluation, determination is made as to whether file system checking has been performed previously on the file system. Based on the determination, file system checking is performed on the file system.

20 Claims, 10 Drawing Sheets

LOGICAL VIEW MAPPED TO FILESYSTEM BLOCKS

MANAGING FILE SYSTEM CHECKING IN FILE SYSTEMS

BACKGROUND

1. Technical Field

This application relates to managing file system checking in file systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

A file system checking (FSCK) utility provides a mechanism to help detect and fix inconsistencies in a file system. The FSCK utility verifies the integrity of the file system and optionally repairs the file system. In general, the primary function of the FSCK utility is to help maintain the integrity of the file system. The FSCK utility verifies the metadata of a file system, recovers inconsistent metadata to a consistent state and thus restores the integrity of the file system.

SUMMARY OF THE INVENTION

A method is used in managing file system checking in file systems. Metadata of a file system is evaluated upon receiving a request to perform file system checking on the file system. Based on the evaluation, determination is made as to whether file system checking has been performed previously on the file system. Based on the determination, file system checking is performed on the file system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
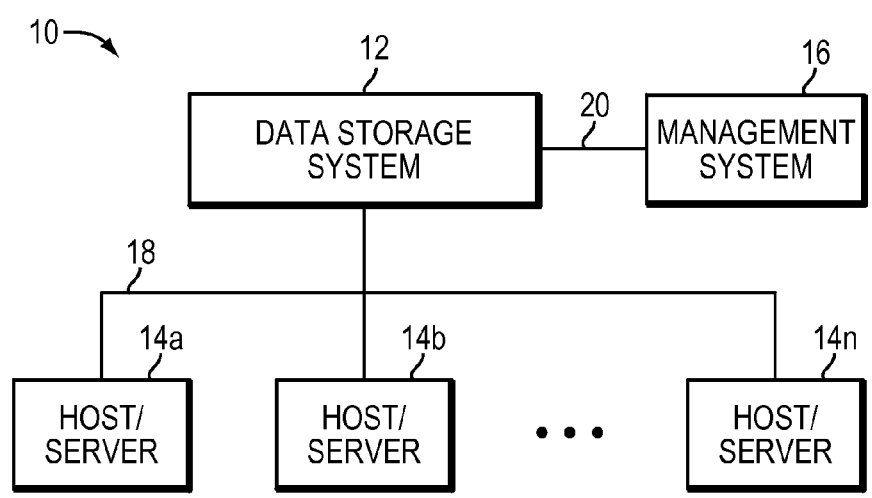
FIGS. 1-3 are examples of an embodiment of a computer system that may utilize the techniques described herein.

Described below is a technique for use in managing file system checking in file systems, which technique may be used to provide, among other things, evaluating metadata of a file system upon receiving a request to perform file system checking on the file system, based on the evaluation, determining whether file system checking has been performed previously on the file system, and based on the determination, perform file system checking on the file system.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

The loss or corruption of metadata of a file system can result in inconsistencies or corruption of the file system. It should be appreciated that such corruptions or inconsistencies may develop in any one of numerous ways, including hardware failures, software bugs, and so on.

File System Checking (FSCK) is a process by which a data storage system verifies integrity of a file system and optionally repairs any inconsistencies found during verification of the file system. In at least some systems, a FSCK utility verifies metadata of a file system, recovers inconsistent metadata to a consistent state and thus restores the integrity of the file system. To verify metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory. Additionally, the FSCK utility uses the stored information to restore the integrity of the file system by fixing inconsistencies found during validation of metadata.

Typically, the FSCK utility requires a large amount of memory to store information such as bitmaps, in order to process the metadata of the file system for verifying the integrity of the file system. For example, one of the bitmaps maintained by the FSCK utility is a block bitmap that includes one bit for every file system block in the file system. Thus, in such a case, for example, if the file system is 256 terabytes (TB) in size and the file system block is 4 kilobytes (KB) in size, the FSCK utility requires at least 64 gigabytes (GB) of memory just to store one block bitmap. As a result, verification of the integrity of a large file system consumes a large amount of storage resources and memory of the data storage system. Therefore, given a limited amount of memory and/or storage resources, not all information required for such verification can fit into such memory of the storage system. Thus, the FSCK utility may optionally store information, such as bitmaps, on a secondary storage device (e.g., disk volumes). Consequently, in such a case, a swap space volume is created from a secondary storage device for storing information required by the FSCK utility to verify integrity of a file system. Further, information is stored for the entire duration of time it takes to verify a file system. However, if the FSCK utility is unable to recover a file system, a user may lose a large portion of enterprise data thereby causing a data loss or unavailability of the enterprise data.

Generally, the total amount of memory and swap space available to the FSCK utility may limit the maximum size of a file system that can be verified for consistency, and may also limit the number of file systems that can be verified simultaneously. As a result, the FSCK utility may require a large amount of time to finish recovering a large file system. However, recovery of a file system may be aborted before the FSCK utility is able to finish recovering the file system. The FSCK utility may be aborted manually by a user in order to conserve system resources. Further, the FSCK utility may be also aborted by a storage system if the FSCk utility is unable to find sufficient system resources (e.g., memory, swap space) in order to recover a file system. Further, the FSCK utility may also be aborted by a storage system when the storage system either reboots or crashes due to any one of reasons such as a software bug, a hardware failure, and so on.

Conventionally, if a FSCK utility is aborted before the FSCK utility is able to finish recovering a file system, processing performed up until the point in time at which the FSCK utility is aborted is not preserved by a storage system and is lost. Such processing includes gathering of metadata of the file system, bitmaps created by the FSCK utility and reconstruction of corrupted metadata by the FSCK utility. Thus, in such a conventional system, work performed by the FSCK utility is lost when the FSCK utility is either aborted or unable to complete processing. As a result, in such a conventional system, restarting recovery of a file system requires the conventional FSCK utility to repeat processing of metadata performed during previous incomplete execution of the FSCK utility. Thus, in such a conventional system, if recovery of a file system is re-started after a previous attempt of recovering the file system has failed, recovery of the file system starts from beginning and verification of metadata performed previously is performed again thereby consuming system resources.

By contrast, in at least some implementations in accordance with the technique as described herein, a FSCK utility uses swap space storage to store information (e.g. bitmaps, validated metadata) gathered and processed by the FSCK utility for recovering a file system such that if the FSCK utility is aborted and restarted at a later time on the file system, information stored on the swap space storage is used to restart recovery of the file system at that later time by avoid gathering and processing information which has already been gathered and processed by the previous incomplete execution of the FSCK utility. Further, in at least one embodiment of the current technique, additional information regarding how much processing has been completed by the FSCK utility is incrementally stored in swap space storage. Thus, in at least one embodiment of the current technique, if the FSCK utility is restarted after the FSCK utility is unable to finish recovery of a file system, the FSCK utility evaluates information stored in swap space storage associated with the file system to determine how much processing has been performed by the FSCK utility and what kind of metadata has been processed and verified during the previous incomplete execution of the FSCK utility. Based on the evaluation, the FSCK utility resumes recovery of the file system by using the metadata and the information that has been gathered and verified previously. Thus, in at least one embodiment of the current technique, upon determining that a previous execution of the FSCK utility failed to complete, the FSCK utility determines the amount of work that has been performed during the previous incomplete execution of the FSCK utility and resumes the current execution of the FSCK utility from the point at which the previous incomplete execution of the FSCK utility has been stopped.

In at least some implementations in accordance with the technique as described herein, the use of the managing file system checking in file systems technique can provide one or more of the following advantages: reducing the amount of time required for recovering a file system by efficiently recovering metadata of the file system, reducing the amount of time required to execute a FSCK utility when the FSCK utility is restarted after a previous incomplete execution of the FSCK utility by using metadata that has been verified during the previous incomplete execution, reducing the amount of time a file system is unavailable for access by reducing the amount of time required to recover the file system, preventing unavailability of user data by efficiently recovering files of a file system by enabling a data storage system to abort and resume file system checking operation on the file system thereby using storage system resources efficiently, and efficiently performing file system checking on file systems by providing an ability to abort executing the FSCK utility on one storage processor and resuming execution of the FSCK utility on another storage processor of a data storage system.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
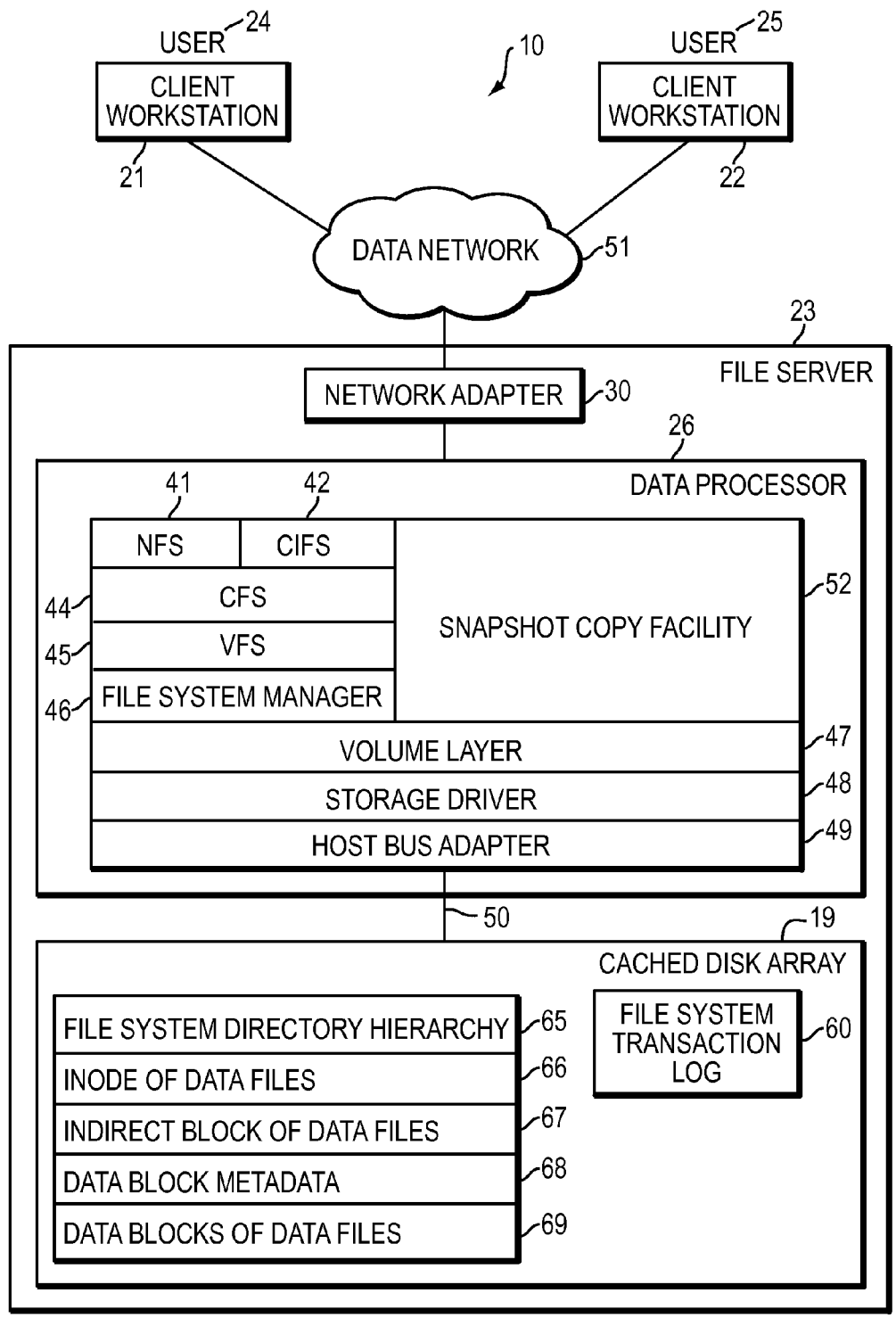

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 7 and 8. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60.

Figure 3:
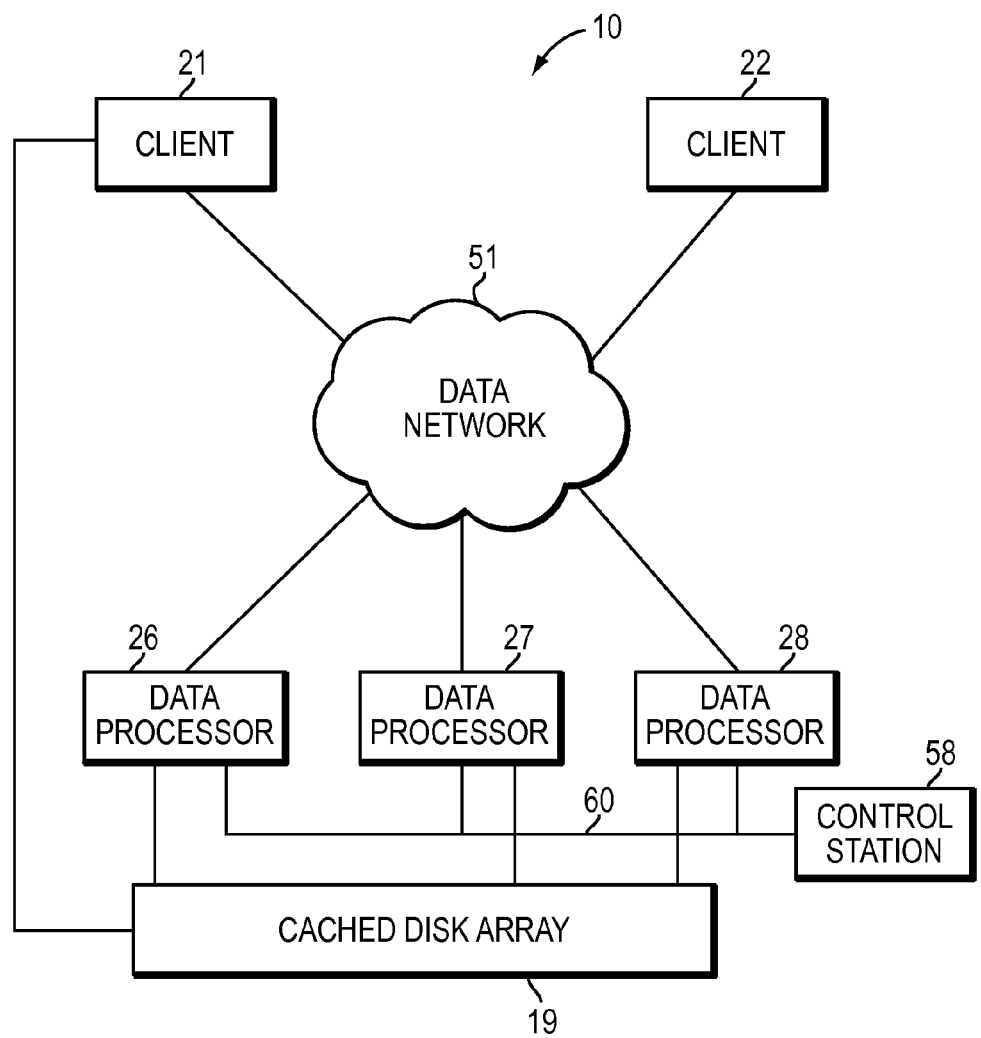

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 4:
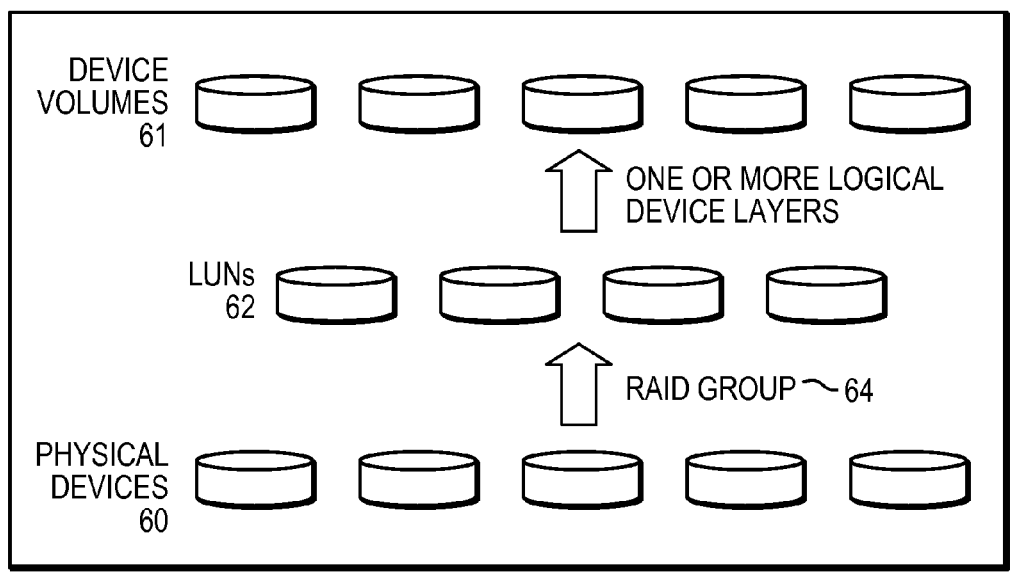
FIG. 4 is an example illustrating storage device layout.

FIG. 4 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

The data storage system 12 may also include one or more mapped devices. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space. Further, a mapped logical unit (also referred to herein as "mapped LUN") may be mapped to a file system.

Figure 5:
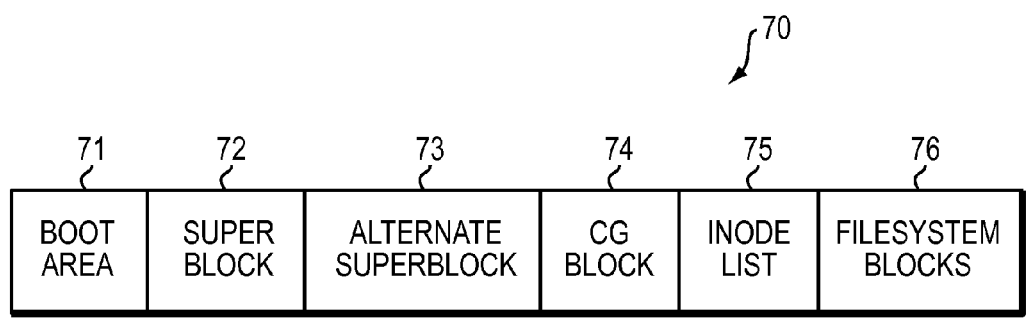
FIGS. 5-9 are diagrams illustrating in more detail components that may be used in connection with techniques herein.

Referring to FIG. 5, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below.

Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Figure 6:
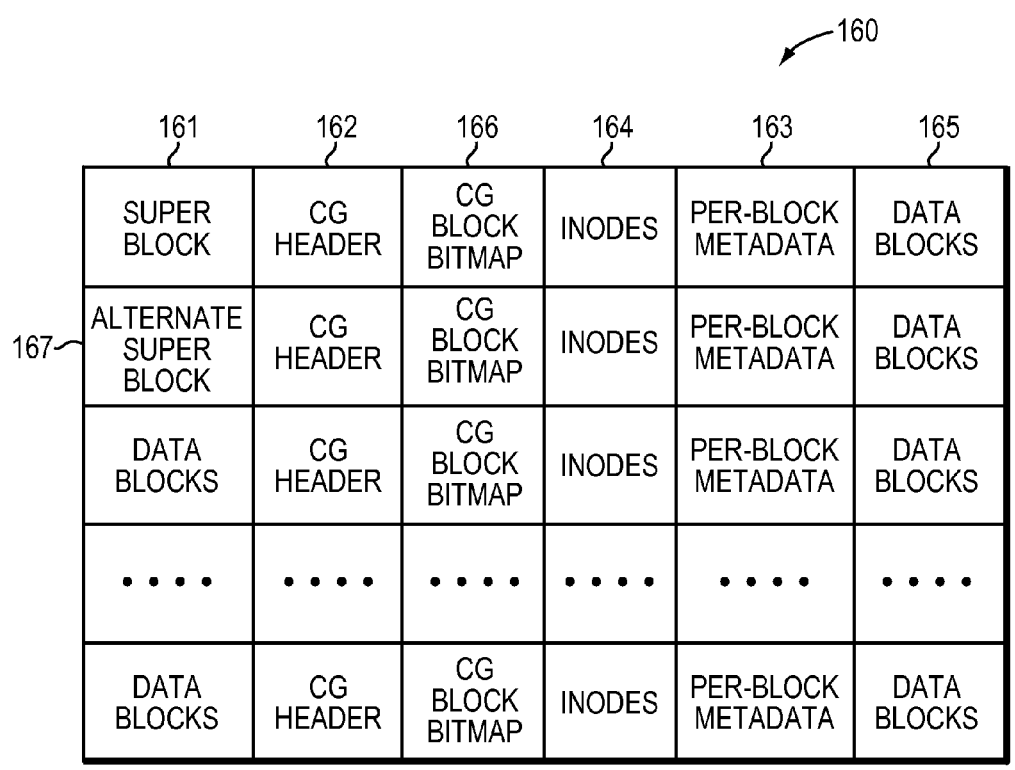

Referring to FIG. 6, shown is a memory map of a logical extent of a file system that may be included in an embodiment using the techniques herein. A logical extent of the file system is subdivided into self-contained cylinder groups. Each cylinder group is of fixed size, such that the size of the cylinder group is the granularity of storage provisioning for the file system. For example, if the file system block size is 8 kilobytes (KB), size of the file system is 4 gigabyte (GB) and size of the cylinder group is 64 megabytes (MB), the file system may include sixty four cylinder group entries, and each cylinder group entry may include 8192 file system blocks. A part of each cylinder group contains metadata of the file system. Other part of each cylinder group contains user's data that is stored in one or more data blocks. Further, each cylinder group includes metadata information that includes a redundant copy of the super-block of a file system, inodes of files of the file system, a bit map describing available blocks in the cylinder group, and information describing the usage of data blocks within the cylinder group. With reference to FIG. 6, each cylinder group (CG) of the file system 160 is a respective row in this memory map. A first cylinder group of the file system 160 indicated by first row of the memory map contains a superblock 161 of the file system, a cylinder group header 162, file system blocks for per-block metadata (BMD) 163 for storing metadata of file system blocks in the cylinder group, inodes 164 of files of file system 160, file system data blocks 165 for the cylinder group, and a cylinder group block bitmap 166 indicating whether or not each file system block in the cylinder group is allocated or not. A second cylinder group of the file system 160 indicated by second row of the memory map has the same format as the first cylinder group. The alternate superblock 167 of the second cylinder group is a copy of the superblock 161 of the first cylinder group. Other cylinder groups have the same format except they do not have a superblock. A file system block can be in one of three states: allocated, free, or reserved. A reserved file system block cannot be allocated or freed. The allocated/free state of a file system block is tracked in the cylinder group block bitmap. Each cylinder group maintains a per-block metadata (BMD) for all file system blocks that it owns. The file system 160 populates the per-block block metadata as and when a file system block is allocated—either for an indirect block or any other metadata block. The per-block metadata 163 is not directly accessible to a network client, and instead it is implicitly accessed in the process of a file system operation that makes use of the cylinder group or file system block contents. For example, the process of allocating or freeing a block of the cylinder group validates and updates block metadata owner state. It should be noted that the memory map of a cylinder group may include other fields (not shown in the FIG. 6) that may be included in a file system stored in data storage system 10.

Figure 7:
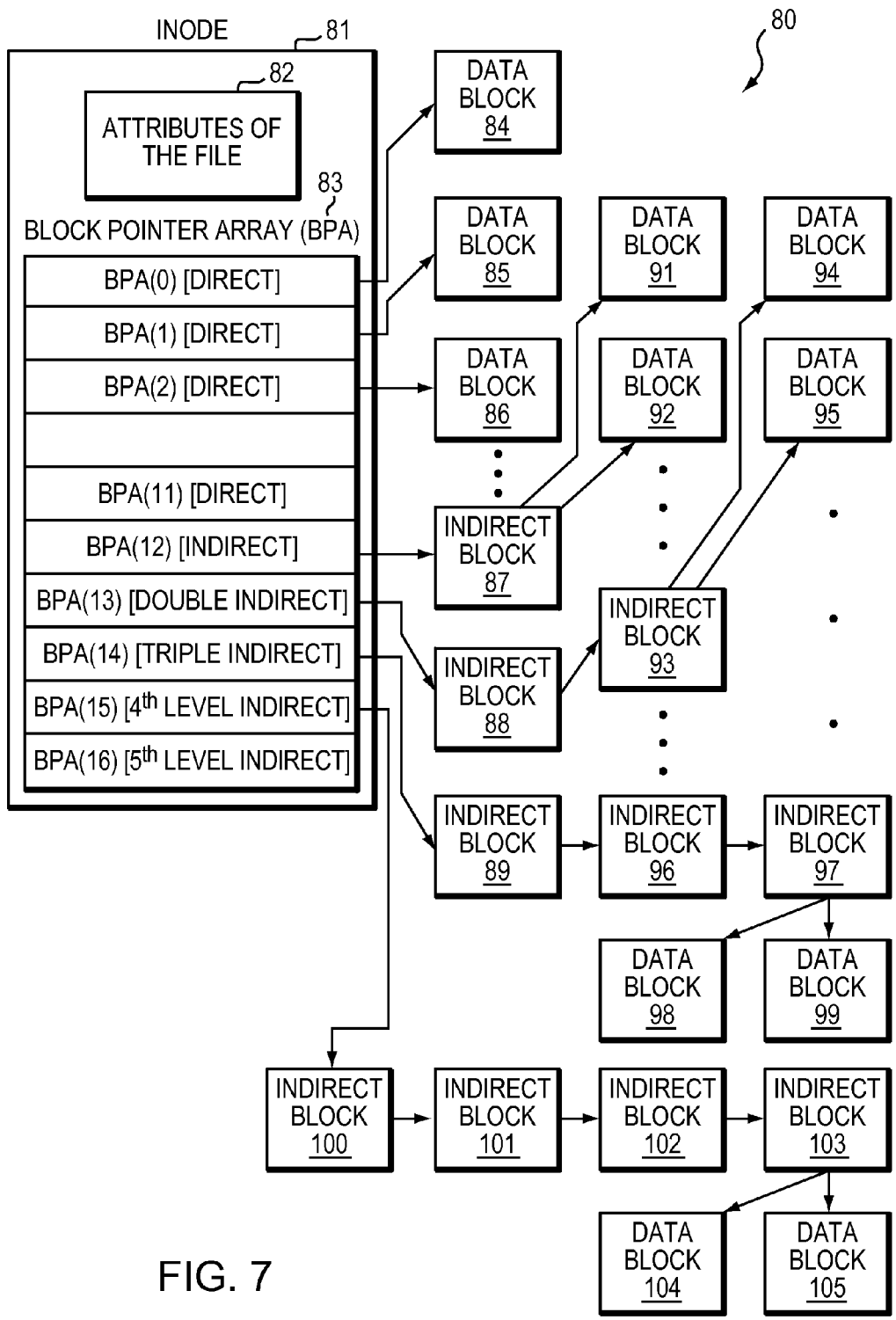

Referring to FIG. 7, shown is a representation of an inode of a file and a file system block tree hierarchy of the file that may be included in an embodiment using the techniques described herein. A file includes an inode 81 containing attributes 82 (such as atime and mtime) of the file, and a block pointer array 83. The block pointer array 83 has seventeen block pointer array entries BPA(0) to BPA(14). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 96 that points to an indirect block 97 that points to one or more additional data blocks (e.g., 98, 99). Similarly the file may include fourth (BPA(15)) and fifth (BPA(16)) level of indirections indicated by indirect blocks 100-103 and data blocks 104-105.

Figure 8:
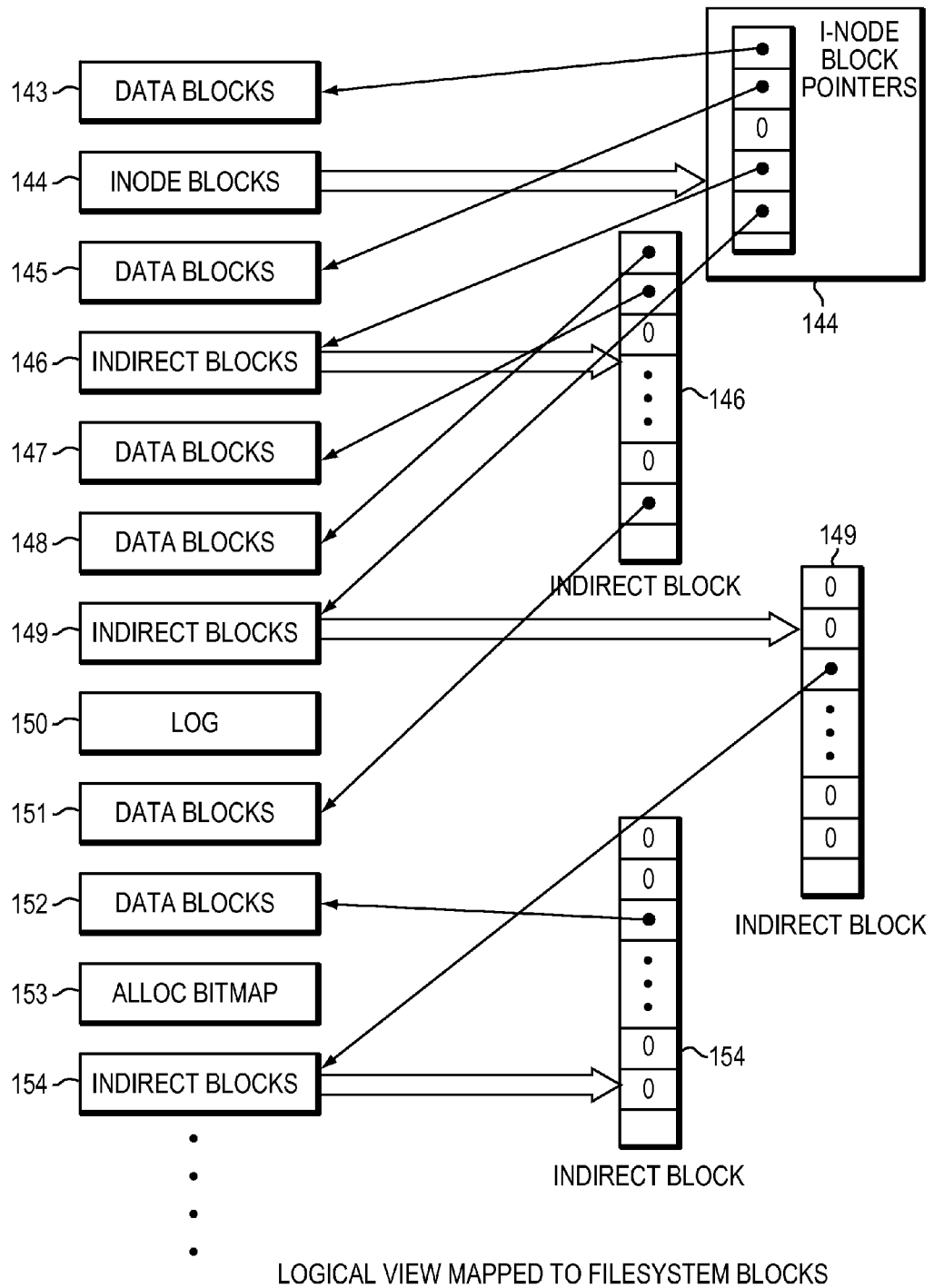

Referring to FIG. 8, shown is a logical and a corresponding physical representation of a file system depicting a standard hierarchical UNIX-based file system using an indirect mapping protocol that may be included in an embodiment using the techniques herein. A file system includes one or more file system blocks. Some of the file system blocks are data blocks 143, 145, 147, 148, 151 and 152, some file system blocks may be indirect block 146, 149 and 154 as described below, or some file system blocks are free blocks that have not yet been allocated to any file in the file system. The first of up to twelve entries of block pointers in the inode 144 directly point to the first of up to twelve data blocks 143, 145, etc. of the file. If the file contains more than twelve data blocks, then the thirteenth entry of the block pointer array 144 contains an indirect block pointer pointing to an indirect block 146 containing pointers to one or more additional data blocks 147, 148, 151, etc. If the file contains so many data blocks that the indirect block 146 becomes full of block pointers, then the fourteenth entry of the block pointer array 144 contains a double indirect block pointer to an indirect block 146 that itself points to an indirect block 149 that points to one or more additional data blocks 152, etc. If the file is so large that the indirect block 149 becomes full of block pointers and its descendant indirect blocks are also full of block pointers, then the fifteenth entry of the block pointer array 144 includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Log 150 provides transactional semantics to a file system and minimizes number of metadata I/Os by logging updates to metadata of the filesystem in the log 150. Allocation bitmap 153 tracks which file system blocks are free in a file system. An entry indicating a value zero in an indirect block represents unallocated regions of a File or a LUN.

Figure 9:
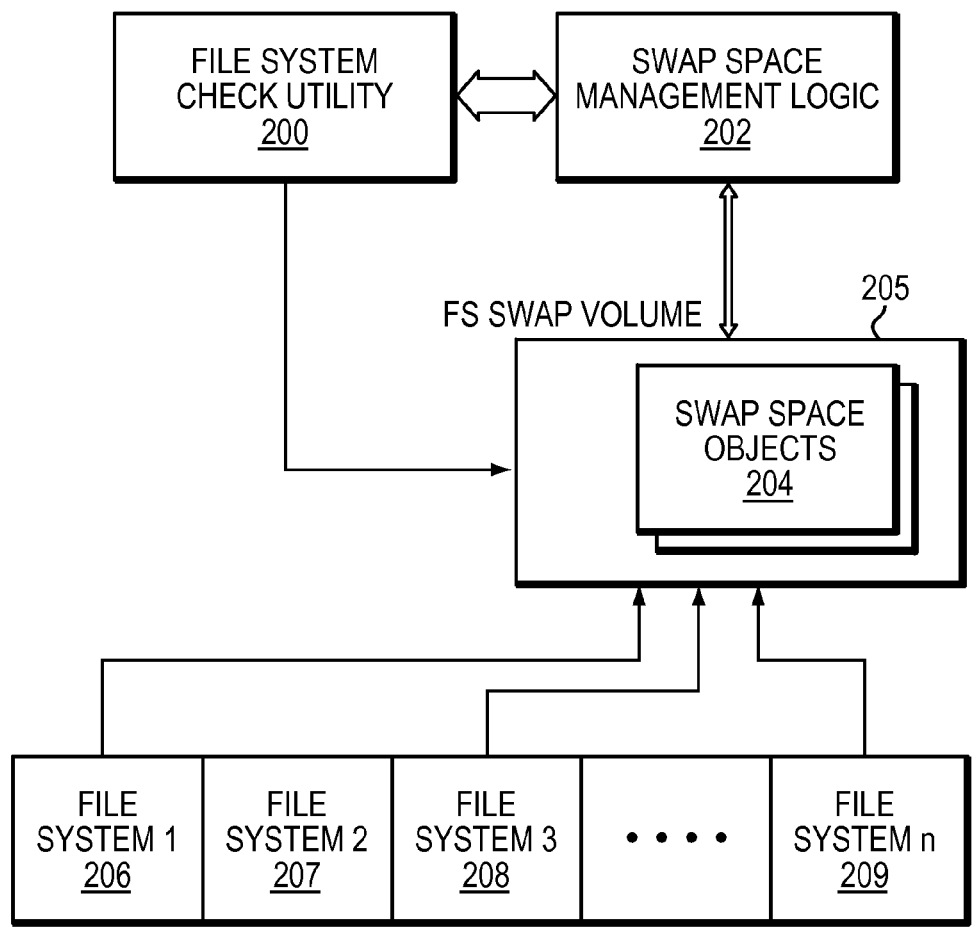

Referring to FIG. 9, shown is a detailed representation of components that may be included in an embodiment using the techniques described herein. File system checking (FSCK) utility 200 may require a large amount of memory to store information (e.g., metadata, bitmaps) in order to verify integrity of a file system. As a result, in a storage system environment having limited amount of storage and memory resources, swap space management logic 202 creates and manages a storage space for storing information required by FSCK utility 200 to verify a file system. Additionally swap space management logic 202 enables FSCK utility 200 to retrieve the information from the storage space at a later time prior to completion of FSCK of the file system. Swap space management logic 202 also allows FSCK utility 200 to store and retrieve fixed size objects to the storage space created for storing information required by FSCK utility 200 transparently. File system swap volume 205 is created for a file system to store the information required by FSCK utility 200. Swap space management logic 202 creates one or more swap space objects 204 within file system swap volume 205 that provide an interface to FSCK utility 200 for storing and retrieving fixed size objects.

Generally, the FSCK utility performs recovery of a file system in one or more phases such that each phase performs a specific task for recovering the file system. In at least one embodiment of the current technique, a new phase is introduced in the FSCK utility which is executed after verification of a superblock of a file system is performed. The new phase of the FSCK utility evaluates information stored in swap space storage to determine whether the FSCK utility has been executed previously for a file system and whether the previous execution of the FSCK utility failed to finish recovering the file system. In such a case, if the FSCK utility is unable to finish recovering the file system, the new phase of the FSCK utility determines the amount of processing that has been completed by the previous execution of the FSCK utility. In such a case, the amount of processing performed by the previous execution of the FSCK utility is used by the FSCK utility to recover the file system.

In at least one embodiment of the current technique, a FSCK iteration number for a file system is generated when the FSCK utility starts recovering the file system. The FSCK iteration number for the file system is then incremented each time the FSCK successfully recovers the file system. In at least one embodiment of the current technique, the FSCK iteration number for a file system is stored in file system metadata such as a superblock for the file system.

Further, in at least one embodiment of the current technique, a point in time copy of metadata information that is stored in swap space blocks by the FSCK utility is saved based on a specific criteria such as at a specific time interval. For example, the FSCK utility may create a point in time copy of metadata that is stored in swap space blocks incrementally at a specific time interval (e.g. every 15 minutes). Alternatively, the FSCK utility may create a point in time copy of metadata that is stored in swap space blocks based on a specific criteria (e.g., at the end of each FSCK phase). A point in time copy of metadata information is also referred to as a checkpoint copy of the metadata. Further, each swap space block saved by the FSCK utility may include a signature to identify progress of the FSCK utility. For example, in at least one embodiment, a signature may include a FSCK iteration number and a checkpoint number.

Thus, in at least one embodiment of the current technique, when the FSCK utility is restarted after a previous execution of the FSCK utility fails to finish recovering a file system, the new FSCK phase determines the last checkpoint copy that has been saved by the previous execution of the FSCK utility upon determining that the FSCK utility failed to recover the file system previously. In such a case, in at least one embodiment of the current technique, the new FSCK phase resumes recovering the file system from the start of the checkpoint that has been saved by the previous execution of the FSCK utility thereby enabling the FSCK utility to skip performing work that has been completed by the previous incomplete execution of the FSCK utility.

Figure 10:
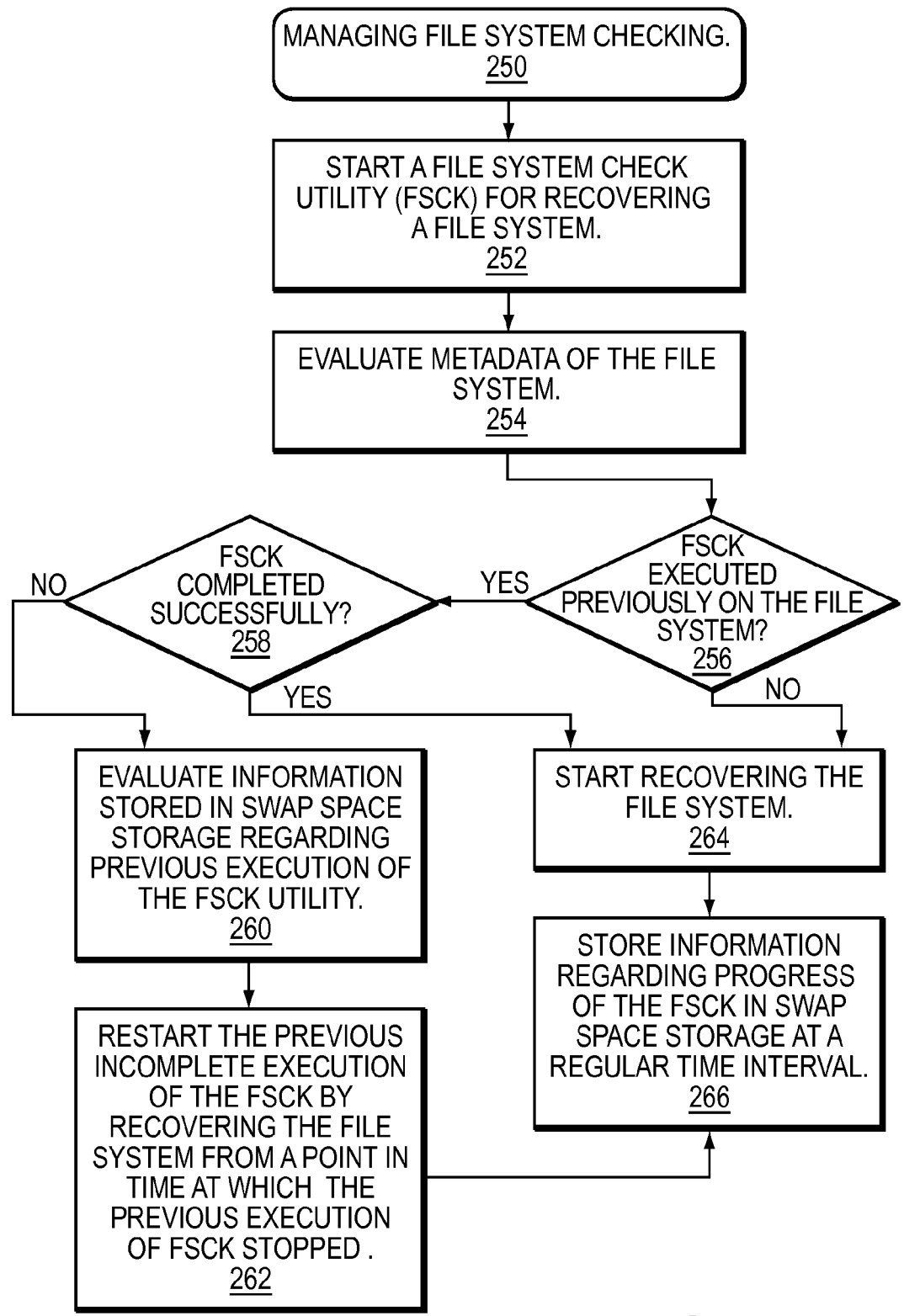
FIG. 10 is a flow diagram illustrating a process that may be used in connection with techniques herein.

Referring to FIG. 10, shown is a flow diagram illustrating the method of managing file system checking in data storage systems. With reference also to FIGS. 1-9, in at least one embodiment of the current technique, the FSCK utility generally iterates over a file system block hierarchy of each inode of a file system. During iteration, the FSCK utility gathers metadata information for each file system block of each file system block hierarchy in the file system and creates metadata structures such as bitmaps for recovering inconsistent metadata. Further, during iteration, the FSCK utility identifies lost or corrupted portions of files of the file system. The FSCK utility then attempts to recover the lost or corrupted portions of files of the file system by processing each lost file system block associated with the lost or corrupted portions of files in order to reconnect each lost file system block to a mapping pointer of an inode or an indirect block.

Generally, the FSCK utility executes in one or more phases. In at least one embodiment of the current technique, during the first phase of the FSCK utility, the FSCK utility iterates over a file system block hierarchy of each inode of a file system and validates block pointers of each inode of the file system. The FSCK utility creates metadata structures for gathering and storing information required for recovering files of the file system. The information may include information regarding which file system blocks are free and which file system blocks are allocated, which references of a file system block have been verified and which references of a file system block have not been verified. It should be noted that the information may be stored in memory, on a storage device or a swap space organized on a storage device. Further, the FSCK utility maintains information regarding how many references for a file system block has been found by evaluating per block metadata of the file system block and a mapping pointer associated with the file system block. Further, the FSCK utility maintains information regarding the type of corruption found at a specific logical offset. Moreover, the FSCK utility maintains information regarding a logical offset range for each inode that has been lost or corrupted. Further, the FSCK utility maintains information regarding whether an inode is completely or partially corrupted. During the second phase, the FSCK utility attempts to reconnect file system blocks that are determined as lost file system blocks because such file system blocks have not been validated successfully during the first phase.

In at least one embodiment of the current technique, the file system utility starts recovering a file system (step 250). The FSCK utility executes in one or more phases (step 252). During the first phase, the FSCK utility evaluates a superblock of the file system (step 254). The superblock of the file system includes metadata indicating whether the FSCK utility has been executed previously for this file system. Based on the evaluation of metadata in the superblock of the file system, a determination is made as to whether the FSCK utility has been executed previously for recovering the file system (step 256). If the FSCK utility has been executed previously, a determination is made as to whether the FSCK utility successfully finished recovering the file system (step 258). Upon determining that the previous execution of the FSCK utility failed to finish recovering the file system, metadata information and information regarding the progress of the previous execution of the FSCK utility stored in swap space storage associated with the file system is evaluated (step 260). Based on the evaluation of information stored in the swap space storage, the FSCK utility resumes the previous failed execution of the FSCK utility by restarting recovering of the file system at the last stable checkpoint indicated by the information in the swap space storage (step 262). However, upon determining that the FSCK utility has not been executed previously, the FSCK utility starts recovering the file system (step 264). When the FSCK utility either starts recovering a file system from the start or resume recovering the file system from the previous failed execution of the FSCK utility, information regarding incremental progress of the FSCk utility is stored in swap space storage associated with the file system (step 266). Such stored information includes a point in time copy of metadata of the file system gathered in swap space blocks in the swap space storage. Further, the point in time copy of metadata indicates information and metadata of the file system that has been processed and verified so far by the FCK utility at that point in time. Thus, the last point in time copy of metadata saved in the swap space storage may be used by the FSCK utility when the FSCK utility restarts after a previous incomplete execution of the FSCK utility.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing file system checking in file systems, the method comprising:

evaluating metadata of a file system upon receiving a request to perform file system checking on the file system, wherein evaluating the metadata of the file system includes evaluating information stored in a persistent storage organized for storing information associated with performing file system checking on the file system, wherein the information stored in the persistent storage includes information regarding file system checking performed previously on the file system;

based on the evaluation, determining whether file system checking has been performed previously on the file system; and based on the determination, performing file system checking on the file system, wherein performing the file system checking on the file system includes resuming file system checking of the file system by using the information stored in the persistent storage regarding the file system checking performed previously on the file system upon determining that the file system checking performed previously on the file system has not been completed successfully.

2. The method of claim 1, further comprising:
based on a specific criteria, storing information regarding file system checking, wherein the information is used to track progress of file system checking on the file system.

3. The method of claim 2, wherein performing file system checking further comprising:
based on information stored regarding file system checking previously performed on the file system, restarting file system checking.

4. The method of claim 2, further comprising:
storing information regarding file system checking for the file system in a swap space volume associated with the file system, wherein the swap space volume is created on a persistent storage.

5. The method of claim 2, wherein the specific criteria includes a time interval.

6. The method of claim 2, storing information regarding file system checking further comprising:
creating a point-in-time copy of metadata gathered for performing file system checking in a swap space volume.

7. The method of claim 1, further comprising:
determining whether the file system checking performed previously on the file system failed to complete; and
based on the determination, restarting file system checking for the file system.

8. The method of claim 1, wherein the file system checking is performed by a FSCK utility.

9. The method of claim 1, wherein a file of a file system is associated with an inode, wherein the file includes a set of file system blocks organized in a file system block hierarchy, wherein a file system block includes a data block and an indirect block.

10. The method of claim 1, wherein the metadata of the file system includes a superblock, wherein the superblock includes information regarding a previous execution of file system checking for the file system.

11. A system for use in managing file system checking in file systems, the system comprising:
first logic evaluating metadata of a file system upon receiving a request to perform file system checking on the file system, wherein evaluating the metadata of the file system includes evaluating information stored in a persistent storage organized for storing information associated with performing file system checking on the file system, wherein the information stored in the persistent storage includes information regarding file system checking performed previously on the file system;
second logic determining, based on the evaluation, whether file system checking has been performed previously on the file system; and
third logic performing, based on the determination, file system checking on the file system, wherein performing the file system checking on the file system includes resuming file system checking of the file system by using the information stored in the persistent storage regarding the file system checking performed previously on the file system upon determining that the file system checking performed previously on the file system has not been completed successfully.

12. The system of claim 11, further comprising:
fourth logic storing, based on a specific criteria, information regarding file system checking, wherein the information is used to track progress of file system checking on the file system.

13. The system of claim 12, wherein performing file system checking further comprising:
fifth logic restarting, based on information stored regarding file system checking previously performed on the file system, file system checking.

14. The system of claim 12, further comprising:
fifth logic storing information regarding file system checking for the file system in a swap space volume associated with the file system, wherein the swap space volume is created on a persistent storage.

15. The system of claim 12, wherein the specific criteria includes a time interval.

16. The system of claim 12, storing information regarding file system checking further comprising:
fifth logic creating a point-in-time copy of metadata gathered for performing file system checking in a swap space volume.

17. The system of claim 11, further comprising:
fourth logic determining whether the file system checking performed previously on the file system failed to complete; and
fifth logic restarting, based on the determination, file system checking for the file system.

18. The system of claim 11, wherein the file system checking is performed by a FSCK utility.

19. The system of claim 11, wherein a file of a file system is associated with an inode, wherein the file includes a set of file system blocks organized in a file system block hierarchy, wherein a file system block includes a data block and an indirect block.

20. The system of claim 11, wherein the metadata of the file system includes a superblock, wherein the superblock includes information regarding a previous execution of file system checking for the file system.

* * * * *